United States Patent [19]

Ehgartner et al.

[11] 4,437,749
[45] Mar. 20, 1984

[54] FILM TRANSPORTING ARRANGEMENT FOR CAMERAS

[75] Inventors: Gabriele Ehgartner, Pullach; Gabriel Vondrovsky, Munich, both of Fed. Rep. of Germany

[73] Assignee: Agfa-Gevaert AG, Leverkusen, Fed. Rep. of Germany

[21] Appl. No.: 405,338

[22] Filed: Aug. 5, 1982

[30] Foreign Application Priority Data

Aug. 26, 1981 [DE] Fed. Rep. of Germany ....... 3133774

[51] Int. Cl.³ .............................................. G03B 1/24
[52] U.S. Cl. .................................... 354/214; 354/212
[58] Field of Search ............... 354/204, 212, 213, 214, 354/215, 216, 217, 218

[56] References Cited

U.S. PATENT DOCUMENTS

| 3,463,071 | 8/1969 | Winkler et al. | 354/212 |
| 3,465,658 | 9/1969 | Hackenberg | 354/212 |
| 3,925,798 | 12/1975 | Sanada et al. | 354/212 |
| 4,134,657 | 1/1979 | Nomura | 354/212 |

Primary Examiner—A. A. Mathews
Attorney, Agent, or Firm—Michael J. Striker

[57] ABSTRACT

A film transporting arrangement of a camera has a film transporting handle, a perforation wheel, a polygonal disk connected with the perforation wheel and having a plurality of surfaces and a number of corners corresponding to the number of teeth of the perforation wheel, and two arresting arms pretensioned relative to one another and arranged so that they engage the surfaces formed between two neighboring corners of the polygonal disk and correspond to these surfaces so as to press the polygonal disk, and thereby the perforation wheel, to a respective angular position.

16 Claims, 3 Drawing Figures

FILM TRANSPORTING ARRANGEMENT FOR CAMERAS

BACKGROUND OF THE INVENTION

The present invention relates to a film transporting arrangement for a camera. More particularly, it relates to a film transporting arrangement which has a film transporting handle, and a perforation wheel which engages a perforated film located in a film mouth of a cassette inserted or insertable in the camera, advantageously through an opening in the film mouth, and moves the film out of the cassette, advantageously into a spoolless film receiving chamber and advantageously transports the film back into the cassette.

Film transporting arrangements of the above described general type are known in the art. In a known film transporting arrangement, an initial portion of a perforated film located in a film mouth of a flat, pocket-shaped cassette or a roll film cassette is moved by a perforation wheel associated with the film mouth or the cassette chamber out of the cassette and in some cases transported back. It is important that the perforation wheel assumes always an angular position in which a perforation tooth engages during insertion of the cassette into associated perforation hole of the initial portion of the film. On the other hand, the drive of the camera is such that a camera user can play in open unloaded camera with the transporting handle or without actuating the latter rotate the perforation wheel by hand. When it is connected with the transporting handle so that it is blocked without its actuation, the rotation of the perforation wheel can lead to damage.

SUMMARY OF THE INVENTION

Accordingly, it is an object of the present invention to provide a film transporting arrangement which avoids the disadvantages of the prior art.

More particularly, it is an object of the present invention to provide a film transporting arrangement in which a perforation wheel for a film transport rotatable by hand in an open camera is so arranged that it automatically moves back or rotates further in an angular position in which a perforation wheel assumes a predetermined position relative to the camera and the inserted film cassette.

In keeping with these objects, and with others which will become apparent hereinafter, one feature of the present invention resides, briefly stated, in a film transporting arrangement in which in addition to a film transport handle and a film perforation wheel, there are a polygonal disk connected with the perforation wheel, and two arresting arms pretensioned relative to one another and arranged so that they engage the polygonal disk at its two surfaces formed between its two neighboring corners and correspond to these surfaces so as to press the polygonal disk and thereby the perforation wheel to a respective angular position.

When the film transporting arrangement is designed in accordance with the present invention, it avoids the disadvantages of the prior art and obtains the above mentioned objects.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
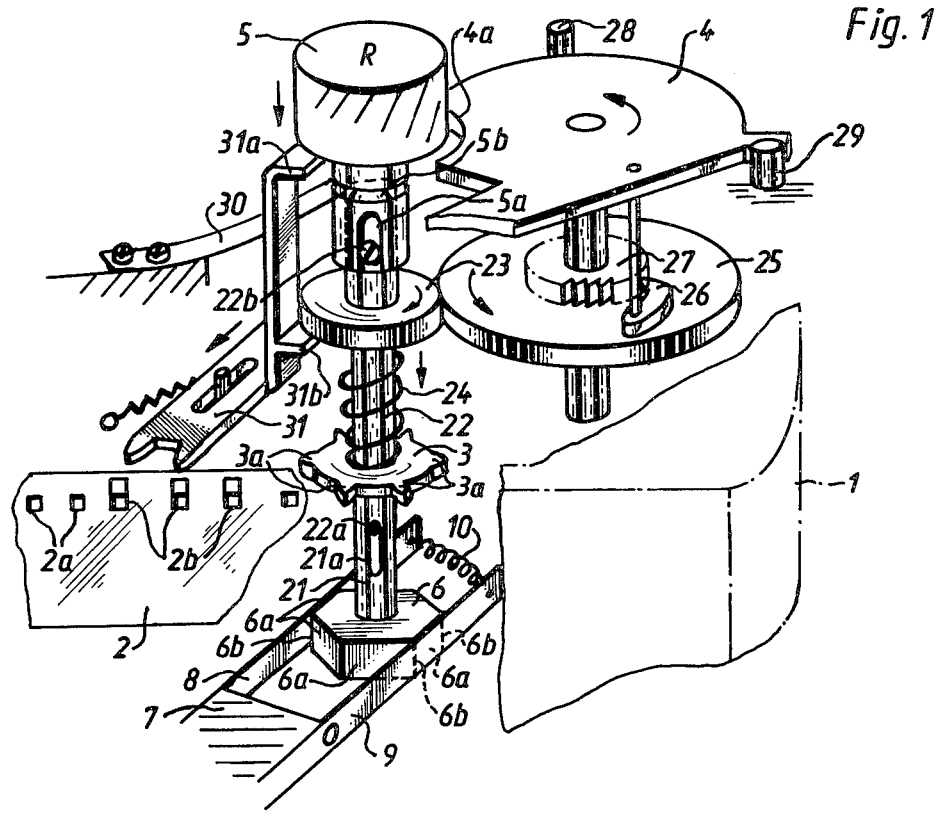
FIG. 1 is a perspective view showing a film transporting arrangement for a camera, in accordance with the present invention.

FIG. 1 shows in dotted lines a partially broken film cassette which is identified by reference numeral 1. An initial film portion of a perforated film 2 is fixedly arranged in a film mouth of the cassette and thereby during insertion of the cassette into the camera is located in a position exactly associated with the latter.

When the cassette 1 is inserted in a not shown camera housing, a tooth 3a of a film transport perforation wheel 3 must be located so that it engages in a perforation hole 2a of the initial film portion, and the perforation wheel transports the film 2 after closing of the not shown camera cover with the aid of a film transport handle 4 out of the cassette 1 into a not shown spoolless film receiving chamber or also into a spoolless film receiving cassette.

It is desirable that the perforation wheel 3 in the open camera and not inserted cassette 1 can rotate independently of the actuation of the film transporting handle 4 by hand or during testing actuation of a rewinding handle 5 (in the event of a spoolless camera-side film take-up chamber instead of a film take-up cassette), inasmuch as by selective actuation tests damage to the camera drive can take place. Because of this, a means is provided by which during rotation of the perforation wheel 3, the perforation wheel 3 is always so directed, moved back or forth, that one of its teeth 3a assumes an angular position relative to the camera in which it engages a perforation hole of a film initial portion fixed in the film mouth of the cassette 1 when it is inserted in the camera over the tooth 3a. The fixation of the film's initial portion can be released in a known manner, for example by closing of the camera cover, so that then the film transport is possible by rotation of the perforation wheel 3.

For orienting the perforation wheel 3 in such a predetermined angular position, a polygonal disk 6 is connected with the perforation wheel 3 for joint rotation therewith and has a number of corners which corresponds to the number of teeth 3a of the perforation wheel 3. When the perforation wheel 3 has, as shown, six teeth 3a, the polygonal disk 6 is formed as a hexagon, in the event of four perforation wheel teeth is formed as a quadrangle, etc. Two parallel flat springs 8 and 9 are fixed on a camera housing 7 substantially parallel to one another at their one ends and pretensioned relative to one another at their other ends, by a spring 10, so that in the predetermined angular position of the perforation wheel 3 they abut against parallel and opposite lateral surfaces 6a of the hexagonal disk 6 with pretensioning.

When the perforation wheel 3 is turned, either by the transporting handle 4, a rewinding handle 5, or in the open camera by hand, the flat springs 8 and 9 are pressed apart from one another by corner edges 6b acting thereupon. When the turning ends, for the connection line of the respective corner edges 6b stands normal to the flat springs 8 and 9, the pressure of the flat springs 8 and 9 against the lateral surfaces 6a makes the rotation again reverse. When the rotation first ends after the connection line of the respective opposite corner edges 6b stands normal to the flat springs 8 and 9 and is inclined, the flat springs 8 and 9 apply a thrust force against the subsequent lateral surfaces 6a and rotate the hexagonal disk 6 and thereby the perforation wheel 3 until the subsequent opposite lateral surfaces 6a lie parallel to the flat springs 8 and 9 and are clamped thereby. Therefore the perforation wheel 3 is again brought into the predetermined position in which a perforation tooth 3a is available for insertion of a cassette.

Figure 2:
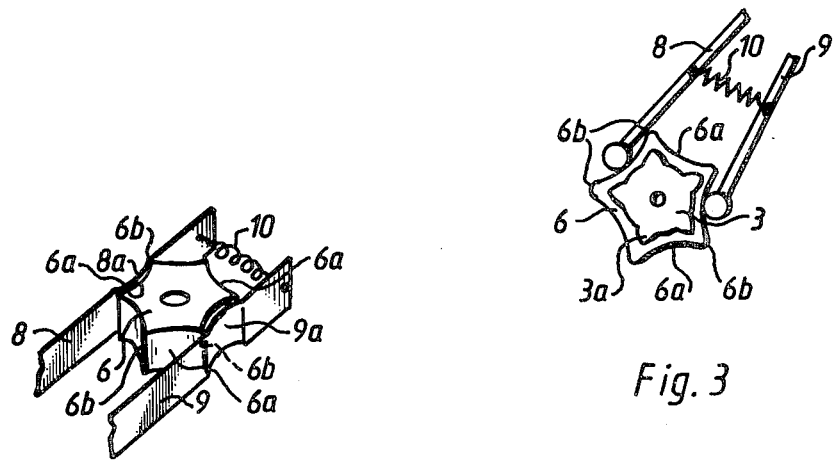
FIG. 2 is a view showing a further embodiment of inventive parts of the film transporting arrangement in accordance with the present invention.

In the embodiment of FIG. 2, instead of the regular polygonal disk 6, there is a regular polygonal disk with an even number of surfaces, namely a regular hexagonal disk 6 associated with the hexagonal perforation wheel 3 and having lateral surfaces 6a which are formed as concave part-cylindrical surfaces. The flat springs 8 and 9 also engage with the opposite lateral surfaces 6a. However, they are not formed as flat parallel surfaces, but instead are provided with concave part-cylindrical portions 8a and 9a which are complementary to the concave part-cylindrical surfaces 6a. The actuation of the arrangement shown in FIG. 2 is similar to the actuation of the arrangement shown in FIG. 1.

Figure 3:
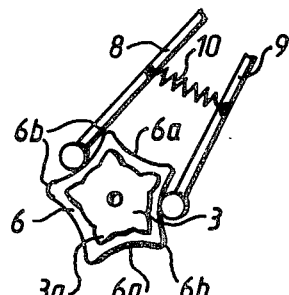
FIG. 3 is a plan view of still a further embodiment of the inventive parts of the film transporting arrangement in accordance with the present invention.

The film transporting arrangement of FIG. 3 has a perforation wheel 3 with an uneven number of teeth (five teeth), and the polygonal disk 6 also has five corners 6b forming concave part-cylindrical surfaces 6a therebetween. The arresting or orienting springs 8 and 9 pretensioned with one another by the spring 10 are arranged here at an angle relative to one another and engage with their free ends against two advantageously not neighboring lateral surfaces 6a at their apex line. During rotation of the perforation wheel 3 and thereby the polygonal disk 6, the ends of the springs 8 and 9 press against the lateral surfaces 6a which act as inclined surfaces and turn after release of the perforation wheel 3 the same back or forth to a position in which the spring ends lie again in the apex of the respective associated lateral surface 6a, whereby again the required orientation of the perforation wheel 3 takes place.

Naturally, the inventive orienting means 6, 8, 9 for the film transport perforation wheel 3 is always suitable when the teeth 3a of the perforation wheel 3 by insertion of the film must have a predetermined position and known or new film transport transmission is utilized, in the event when the rewinding handle 5 can be located in an indefinite intermediate position or the perforation wheel 3 in the open camera can be turned in one direction. Generally, such a film transport transmission serves for the purpose that the film transporting handle 4 must always be brought first in an end position, before it can turn again or in another direction, so that in the open camera one can start from a fixed arrangement of a transport handle end position to a predetermined perforation wheel position.

FIG. 1 illustrates for completeness half of transmission in connection with the inventive orienting means 6, 8 and 9 for a transport perforation wheel 3. The perforation wheel 3 is supported together with the polygonal disk 6 on a hollow shaft 21. A pin 22a of a further shaft 22 which is axially movable relative to the hollow shaft 21 engages in a slot 21a of the latter. A coupling gear 23 is arranged on the hollow shaft 22 and pressed under the action of a spring 24 to engagement with a gear 25. The latter is driven via a pawl stepping mechanism 26, 27 in counterclockwise direction by the film transporting handle 4 formed as a fast-switch handle. During the return rotation of the film transporting handle 4, the gear 25 remains immovable. The film transporting lever 4 is movable between two stops 28 and 29. The stop 29 determines the immovable position, whereas the stop 28 determines a position after a film transport by one frame. With the known means it serves the purpose that the film transporting lever 4 in one end position must move, before it again can move in the other direction. The film transporting lever 4 has a round recess 4a corresponding to the rounding of the neighboring rewinding handle 5 and located in the immovable position of the film transporting lever 4 under the rewinding handle 5 in alignment with its outer contour, wherein with the inactive rewinding handle 5 the film turning lever 4 is rotatable therebelow.

The rewinding handle 5 is non-rotatable relative to the shaft 22 via the pin-slot connection 5a, 22b, but is displaceable and can be pulled downwardly by a flat spring 30 engageable in a groove 5b. The gear 23 is retained under the action of the spring 24 because of the abutment between the pin-slot connection 21a, 22a in engagement with the gear 25. The rewinding handle 5 is locked by a tongue 31 of a film sensing element 31 which senses an end perforation 2b of the film, against falling downwardly in a position locking the film transporting handle 4. A further locking tongue 31b of the film sensing element lies under the gear 23 and secures it against unintentional displacement from the coupled film transport position.

When the film sensing element 31 falls in the film end perforation b, the tongues 31a and 31b are turned back from the axial movement path of the rewind handle 5 and the gear 23. As soon as the film transporting lever 4 is turned back in its immovable position, the rewinding handle 4 falls under the action of the spring 30 into the recess 4a so that the film transporting lever can no longer be actuated and prevents tearing off the film out of the cassette. Now the rewinding handle 5 is pressed downwardly against the action of the spring 24 so that the coupling gear 23 is out of engagement with the gear 24. In this position the rewinding handle 5 can be locked in a known manner. By rotation of the rewinding handle 5 the film 2 is now wound back into the cassette. The film sensing element 31 turns from the film end perforation 2b can again abut with its tongue 31a outwardly on the rewinding handle 5. When the rewinding step ends and the camera cover opens, the rewinding handle 5 is moved back in a known manner in its non-used position in a not shown manner, the coupling gear 23 moves in its coupled position, and the tongues 31a and 31b are brought back by the camera back cover to their shown position, whereby the film transporting handle 4 can again be actuated.

It will be understood that each of the elements described above, or two or more together, may also find a useful application in other types of constructions differing from the types described above.

While the invention has been illustrated and described as embodied in a film transporting arrangement of a camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A film transporting arrangement of a camera, comprising
   a film transporting handle;
   a perforation wheel having a predetermined number of teeth and arranged to engage a perforated film in a film mouth of a cassette inserted or insertable in a camera and to move the film out of the cassette, said perforation wheel being rotatable in an open camera by hand;
   a polygonal disk connected with said perforation wheel and having a plurality of surfaces and a number of corners corresponding to the number of teeth of said perforation wheel; and
   two arresting arms pretensioned relative to one another, said arresting arms engaging the surfaces formed between two neighboring corners of said polygonal disk and corresponding to said surfaces between two neighboring corners so as to press said polygonal disk and thereby said perforation wheel to a respective angular position.

2. A film transporting arrangement as defined in claim 1, wherein the film mouth of the cassette has an opening, said perforation wheel being engageable with the film through the opening of the film mouth.

3. A film transporting arrangement as defined in claim 1, wherein the camera has a spoolless film receiving chamber, said perforation wheel being arranged to move the film from the cassette into the spoolless film receiver chamber of the camera.

4. A film transporting arrangement as defined in claim 1, wherein said perforation wheel is arranged to move the film back into the cassette.

5. A film transporting arrangement as defined in claim 1, wherein said perforation wheel has an even number of teeth, said polygonal disk having an even number of corners, said arms being formed as two flat springs abutting against two opposite surfaces of said polygonal disk.

6. A film transporting arrangement as defined in claim 5, wherein each of said flat springs has two ends and is fixed at one of its ends; and further comprising a spring pretensioning said flat springs at the other of their ends.

7. A film transporting arrangement as defined in claim 1, wherein said polygonal disk is formed as a star wheel whose lateral surfaces are formed as concave part-cylindrical surfaces.

8. A film transporting arrangement as defined in claim 7, wherein said star wheel has an even number of teeth, said arms being formed as flat springs pretensioned relative to one another and engaging two opposite concave part-cylindrical surfaces of said star wheel, said flat springs having a shape which is complementary to said opposite part-cylindrical surfaces of said star wheel.

9. A transporting arrangement as defined in claim 7, wherein said star wheel has an uneven number of teeth, said arms being pretensioned at an angle relative to one another and engaging the two surfaces of the star wheel.

10. A film transporting arrangement as defined in claim 9, wherein said arms are arranged to engage the star wheel at the two surfaces which are spaced from one another.

11. A film transporting arrangement as defined in claim 1, wherein said surfaces of said polygonal disk are concave and have a predetermined radius, said arms having in an engaging region a radius which is somewhat smaller than the radius of said surfaces of said polygonal disk.

12. A film transporting arrangement as defined in claim 11, wherein said arms engage the surfaces of said polygonal disk in an engaging region and are formed in said engaging region as rollers.

13. A film transporting arrangement as defined in claim 1; and further comprising a rewinding handle, gears connected or connectable with said perforation wheel, and a driving coupling provided between said gears and said transporting handle and arranged to act in a film transport actuating direction of said transporting handle and in one direction, so that said perforation wheel is not driven opposite to said film transport actuating direction from said transporting handle and with an open camera, or is rotatable by said rewinding handle together with said polygonal disk.

14. A film transporting arrangement as defined in claim 13, wherein said driving coupling between said gears and said transporting handle is formed as a stepping mechanism.

15. A film transporting arrangement as defined in claim 14, wherein said rewinding handle is axially displaceable, said perforation wheel and said polygonal disk being connected with said rewinding handle for joint rotation therewith, said gears including a first gear connected for joint rotation with said perforation wheel and a second gear connected with said driving coupling, said rewinding handle being arranged to disengage said first gear from said second gear.

16. A film transporting arrangement as defined in claim 1; and further comprising a rewinding handle, and a film sensing element arranged to release said rewinding handle upon reaching a film end.

* * * * *